(12) United States Patent
Light-Holets

(10) Patent No.: US 9,103,248 B2
(45) Date of Patent: Aug. 11, 2015

(54) METHOD AND SYSTEM FOR OPTIMIZING FUEL AND REDUCTANT CONSUMPTION

(71) Applicant: CUMMINS INC., Columbus, IN (US)

(72) Inventor: Jennifer K. Light-Holets, Greenwood, IN (US)

(73) Assignee: CUMMINS INC., Columbus, IN (US)

( * ) Notice: Subject to any disclaimer, the term of this patent is extended or adjusted under 35 U.S.C. 154(b) by 63 days.

(21) Appl. No.: 13/756,245

(22) Filed: Jan. 31, 2013

(65) Prior Publication Data

US 2013/0152549 A1     Jun. 20, 2013

Related U.S. Application Data

(63) Continuation-in-part of application No. 11/655,268, filed on Jan. 19, 2007, which is a continuation-in-part of application No. 11/334,735, filed on Jan. 19, 2006, now Pat. No. 7,861,518.

(51) Int. Cl.
| | |
|---|---|
| *F01N 3/00* | (2006.01) |
| *F01N 9/00* | (2006.01) |
| *F01N 3/20* | (2006.01) |
| *F02D 41/00* | (2006.01) |
| F02D 41/02 | (2006.01) |
| F02D 41/14 | (2006.01) |

(52) U.S. Cl.
CPC *F01N 9/00* (2013.01); *F01N 3/208* (2013.01); *F02D 41/005* (2013.01); *F01N 2610/02* (2013.01); *F01N 2610/146* (2013.01); *F01N 2900/08* (2013.01); *F01N 2900/102* (2013.01); *F01N 2900/12* (2013.01); *F01N 2900/1812* (2013.01); *F01N 2900/1814* (2013.01); *F02D 41/0235* (2013.01); *F02D 41/1406* (2013.01); *F02D 2200/0625* (2013.01); *Y02T 10/24* (2013.01); *Y02T 10/47* (2013.01)

(58) Field of Classification Search
CPC ....... F01N 3/0842; F01N 3/035; F01N 13/02; F01N 9/002; F02D 41/029
USPC ............. 60/273, 274, 285, 286, 295, 301; 701/123, 31.5, 32.4
See application file for complete search history.

(56) References Cited

U.S. PATENT DOCUMENTS

| | | | |
|---|---|---|---|
| 4,063,072 | A | 12/1977 | Sochtig et al. |
| 4,926,331 | A | 5/1990 | Windle et al. |
| 5,116,579 | A | 5/1992 | Kobayashi et al. |
| 5,280,756 | A | 1/1994 | Labbe |
| 5,788,936 | A | 8/1998 | Subramanian et al. |
| 5,842,341 | A | 12/1998 | Kibe |
| 5,924,280 | A | 7/1999 | Tarabulski |
| 5,968,464 | A | 10/1999 | Peter-Hoblyn et al. |

(Continued)

OTHER PUBLICATIONS

SPATCO DEF Dispensing Systems, DEF Infrastructure, An Industry Progress Report, White Paper, Fall 2010, 10 pgs.

(Continued)

*Primary Examiner* — Thomas Denion
*Assistant Examiner* — Patrick Maines
(74) *Attorney, Agent, or Firm* — Foley & Lardner LLP

(57) ABSTRACT

An operation mode of an engine and after-treatment system is determined based on a reductant-to-fuel cost ratio. The operation mode optimizes fuel consumption and reductant consumption in an engine system including an internal combustion engine and a selective catalytic reduction (SCR) catalyst while satisfying a target emissions emission level.

14 Claims, 5 Drawing Sheets

(56) References Cited

U.S. PATENT DOCUMENTS

| | | |
|---|---|---|
| 6,119,448 A | 9/2000 | Emmerling et al. |
| 6,151,547 A | 11/2000 | Kumar et al. |
| 6,343,468 B1 | 2/2002 | Doelling et al. |
| 6,352,490 B1 | 3/2002 | Makki et al. |
| 6,363,771 B1 | 4/2002 | Liang et al. |
| 6,438,944 B1 | 8/2002 | Bidner et al. |
| 6,487,849 B1 | 12/2002 | Bidner et al. |
| 6,487,850 B1 | 12/2002 | Bidner et al. |
| 6,553,301 B1 | 4/2003 | Chhaya et al. |
| 6,662,553 B2 | 12/2003 | Patchett et al. |
| 6,681,565 B2 | 1/2004 | Russell |
| 6,742,330 B2 | 6/2004 | Genderen |
| 6,813,884 B2 | 11/2004 | Shigapov et al. |
| 6,868,294 B2 | 3/2005 | Kouno et al. |
| 6,895,747 B2 | 5/2005 | Upadhyay et al. |
| 7,530,220 B2 | 5/2009 | Miller et al. |
| 7,861,518 B2 | 1/2011 | Federle |
| 2003/0200022 A1 | 10/2003 | Streichsbier et al. |
| 2004/0128982 A1 | 7/2004 | Patchett et al. |
| 2005/0056004 A1 | 3/2005 | Kakwani et al. |
| 2005/0124459 A1 | 6/2005 | Ito |
| 2007/0079605 A1 | 4/2007 | Hu et al. |
| 2007/0163244 A1* | 7/2007 | Federle ............................ 60/286 |
| 2007/0245714 A1* | 10/2007 | Frazier et al. ................... 60/276 |
| 2008/0306631 A1* | 12/2008 | Huang ........................... 700/271 |
| 2009/0118969 A1 | 5/2009 | Heap et al. |
| 2009/0293457 A1 | 12/2009 | Grichnik et al. |
| 2010/0024397 A1 | 2/2010 | Chi et al. |
| 2010/0229541 A1* | 9/2010 | Nandyala et al. ............... 60/299 |
| 2011/0011068 A1 | 1/2011 | Ren et al. |
| 2011/0048372 A1 | 3/2011 | Dibble et al. |
| 2011/0077806 A1 | 3/2011 | Hyde et al. |
| 2011/0162350 A1* | 7/2011 | Ponnathpur .................... 60/274 |
| 2011/0167805 A1* | 7/2011 | Chen .............................. 60/286 |
| 2011/0264353 A1 | 10/2011 | Atkinson et al. |
| 2013/0067890 A1* | 3/2013 | Michalek et al. ............... 60/274 |
| 2013/0111878 A1 | 5/2013 | Pachner et al. |
| 2013/0261930 A1* | 10/2013 | Kurtz et al. .................... 701/102 |
| 2014/0150409 A1* | 6/2014 | George et al. .................. 60/274 |
| 2014/0207316 A1* | 7/2014 | Kolambekar ................... 701/19 |

OTHER PUBLICATIONS

International Search Report, PCT/US2007/001480, Sep. 16, 2008.
International Search Report, PCT/US2007/001481, Nov. 24, 2008.

* cited by examiner

METHOD AND SYSTEM FOR OPTIMIZING FUEL AND REDUCTANT CONSUMPTION

CROSS REFERENCE TO RELATED APPLICATIONS

This application is a Continuation-in-Part of U.S. application Ser. No. 11/655,268 filed Jan. 19, 2007, which is a Continuation-in-Part of U.S. application Ser. No. 11/334,735 filed Jan. 19, 2006, and now U.S. Pat. No. 7,861,518, the entire contents of which are incorporated herein by reference.

TECHNICAL FIELD

The technical field relates generally to the reduction of pollutants from emissions released by automotive engines, and more particularly to the optimization of the operation of an engine and after-treatment devices in order to meet performance and/or emissions criteria.

BACKGROUND

Diesel engines offer good fuel economy and low emissions of hydrocarbons (HC) and carbon monoxide (CO). The air-fuel mixture in the combustion chamber is compressed to an extremely high pressure, causing the temperature to increase until the fuel's auto-ignition temperature is reached. The air-to-fuel ratio for diesel engines is much leaner (more air per unit of fuel) than for gasoline engines, and the larger amount of air promotes more complete fuel combustion and better fuel efficiency. As a result, emissions of HCs and CO are lower for diesel engines than for gasoline engines. However, with the higher pressures and temperatures in the diesel engine, emissions of nitrogen oxides (e.g., NO or $NO_2$), which are known collectively as NOx, tend to be higher because the high combustion chamber temperatures cause the oxygen and nitrogen in the intake air to combine as nitrogen oxides. Hence, emissions of nitrogen oxides are a result of very high thermal efficiencies of the diesel engine.

Additionally, as a further disadvantage, diesel engines produce an amount of exhaust particulate matter (PM), or soot, that is comparatively larger than that of gasoline engines. PM is a complex emission that includes elemental carbon, heavy hydrocarbons derived from the fuel and lubricating oil, and hydrated sulfuric acid derived from the fuel sulfur. Diesel particulates include small nuclei mode particles having diameters below 0.4 μm and their agglomerates of diameters up to 1 μm. PM is formed when insufficient air or low combustion temperature prohibits the complete combustion of free carbon. As such, PM is partially unburned fuel or lube oil and is often seen as black smoke.

NOx emissions from diesel engines pose a number of health and environmental concerns. Once in the atmosphere, NOx reacts with volatile organic compounds or hydrocarbons in the presence of sunlight to form ozone, leading to smog formation. Ozone is corrosive and contributes to many pulmonary function problems, for instance.

Moreover, the fine particles that make up PM in diesel exhaust can penetrate deep into the lungs and pose serious health risks including aggravated asthma, lung damage, and other serious health problems. PM from diesel engines also contributes to haze, which restricts visibility.

Due to their damaging effects, governmental agencies have imposed increasingly stringent restrictions for NOx as well as PM emissions. Two mechanisms can be implemented to comply with emission control regulations: manipulation of engine operating characteristics and implementation of after-treatment control technologies.

In general, manipulating engine operating characteristics to lower NOx emissions can be accomplished by lowering the intake temperature, reducing power output, retarding the injector timing, reducing the coolant temperature, and/or reducing the combustion temperature.

For example, cooled exhaust gas recirculation (EGR) is well known and is the method that most engine manufacturers are using to meet environmental regulations. When an engine uses EGR, a percentage of the exhaust gases is drawn or forced back into the intake and mixed with the fresh air and fuel that enters the combustion chamber. The air from the EGR lowers the peak flame temperatures inside the combustion chamber. Intake air dilution causes most of the NOx reduction by decreasing the $O_2$ concentration in the combustion process. To a smaller degree, the air also absorbs some heat, further cooling the process. The use of EGR increases fuel consumption.

In addition to EGR, designing electronic controls and improving fuel injectors to deliver fuel at the best combination of injection pressure, injection timing, and spray location allows the engine to burn fuel efficiently without causing temperature spikes that increase NOx emissions. For instance, controlling the timing of the start of injection of fuel into the cylinders impacts emissions as well as fuel efficiency. Advancing the start of injection, so that fuel is injected when the piston is further away from top dead center (TDC), results in higher in-cylinder pressure and higher fuel efficiency, but also results in higher NOx emissions. On the other hand, retarding the start of injection delays combustion, but lowers NOx emissions. Due to the delayed injection, most of the fuel is combusted at lower peak temperatures, reducing NOx formation.

With EGR engines, one of the key components to emissions control is the turbocharger. Most manufacturers using EGR technology have developed versions of variable geometry turbochargers (VGT), which are designed to regulate the flow of cooled exhaust air back into the combustion chamber, depending on the engine's speed.

The precise amount of exhaust gas that must be metered into the intake manifold varies with engine load. High EGR flow is generally necessary during cruising and mid-range acceleration, when combustion temperatures are typically very high. On the other hand, low EGR flow is needed during low speed and light load conditions. No EGR flow should occur during conditions when EGR could negatively or significantly impact engine operating efficiency or vehicle driveability, e.g., during engine warm up, idle, or wide open throttle.

Reducing NOx by manipulating engine operation generally reduces fuel efficiency. Moreover, mere manipulation of engine operation may not sufficiently reduce the amount of NOx to mandated levels. As a result, after-treatment systems also need to be implemented. In general, catalysts are used to treat engine exhaust and convert pollutants, such as carbon monoxide, hydrocarbons, as well as NOx, into harmless gases. In particular, to reduce NOx emissions, diesel engines on automotive vehicles can employ a catalytic system known as a urea-based selective catalytic reduction (SCR) system. Fuel efficiency benefits of 3 to 10% can result from using SCR systems that reduce NOx through chemical reduction rather than manipulating engine operation for NOx reduction which negatively impacts fuel efficiency. SCR catalysts (sometimes referred to herein as "SCR") currently are used in diesel after-treatment systems. The SCR is typically fluidly connected to, and positioned downstream a diesel oxidation catalyst (DOC) with a particulate filter (e.g., a diesel particulate filter (DPF)) provided between the SCR and DOC. The SCR requires a reductant dosing system, such as a diesel exhaust fluid (DEF) dosing system, which is provided upstream of the SCR to inject a reductant such as anhydrous $NH_3$, aqueous $NH_3$, or most often a precursor that is convertible to $NH_3$ such as urea ammonia or urea, into the exhaust flow.

Urea-based SCR systems can be viewed according to four major subsystems: the injection subsystem that introduces urea into the exhaust stream, the urea vaporization and mixing subsystem, the exhaust pipe subsystem, and the catalyst subsystem. Several SCR catalysts are available for diesel engines, including platinum, vanadium, and zeolite.

A diesel vehicle, stationary engine system, portable engine system must carry a supply of urea solution, or DEF, for the SCR system. The DEF is typically 32.5% urea in water by weight and is stored in a container, such as a tank or removable and/or refillable cartridge. The DEF is pumped from the container and sprayed through an atomizing nozzle into the exhaust gas stream, although other types and forms of reductant dosing systems can be used such as solid ammonia stored in a refillable cartridge. Complete mixing of urea or ammonia with exhaust gases and uniform flow distribution are critical in achieving high NOx reductions.

Urea-based SCR systems use gaseous ammonia to reduce NOx. During thermolysis, the heat of the gas breaks the urea ($CO(NH_2)_2$) down into ammonia ($NH_3$) and hydrocyanic acid (HCNO). The ammonia and the HCNO then meet the SCR catalyst where the ammonia is absorbed and the HCNO is further decomposed through hydrolysis into ammonia. When the ammonia is absorbed, it reacts with the NOx to produce water, oxygen gas ($O_2$), and nitrogen gas ($N_2$). The amount of ammonia injected into the exhaust stream is a critical operating parameter. The required ratio of ammonia to NOx is typically stoichiometric. The ratio of ammonia to NOx must be maintained to assure high levels of NOx reduction. However, the SCR system can never achieve 100% NOx reduction due to imperfect mixing, etc.

A common problem with all SCR systems is ammonia slip. Ammonia slip refers to tailpipe emissions of ammonia that occur when: i) exhaust gas temperatures are too cold for the SCR reaction to occur, or ii) the amount of ammonia introduced into the exhaust stream is more than is required for the amount of NOx present Ammonia that is not reacted will slip through the SCR catalyst bed and exhaust to the atmosphere. Ammonia slip is a regulated emissions parameter which may not exceed a fixed concentration in the SCR exhaust.

Although the approaches described hereinabove may be effective in reducing NOx emissions, it is generally difficult to reduce both NOx emissions and PM emissions simultaneously. Conventionally, efforts to reduce NOx through various aspects of engine design tend to increase PM, or vice versa. In particular, very high temperatures in the combustion chamber help reduce PM emissions, but produce higher levels of NOx. On the other hand, lowering the peak temperatures in the combustion chamber reduces the amount of NOx as described previously, but increases the likelihood of PM formation. For example, advancing injection timing creates higher peak cylinder temperatures which burn off PM but produce NOx. Meanwhile, retarding timing reduces temperatures to minimize NOx emissions, but the reduced temperatures result in less complete combustion and increases PM. For similar reasons, the use of EGR to cool lower combustion temperatures increases PM emissions.

Among various engine operating characteristics, PM emissions can be reduced by advancing injection timing, increasing fuel injection pressures, increasing the power output, reducing engine speed, and reducing oil consumption. Additionally, a turbocharger can be employed to increase the charge pressure which allows the engine to operate on a leaner mixture resulting in lower particulate emissions.

After-treatment devices, such as a particulate filter (e.g., DPF), also exist to reduce or remove PM in diesel exhaust. Such after-treatment devices are often required in order to meet both NOx and PM emissions requirements, due to the difficulty of simultaneously reducing NOx and PM emissions by altering engine parameters, such as fuel injection timing.

For example, the DOC and DPF combination can provide effective approaches to purify PM emissions from a diesel engine. A DOC is a catalytic device that is used in the abatement of HC, CO, and the soluble organic fraction (SOF) of PM in diesel exhaust. A DPF has a filter with very small pores which are designed to remove PM, or soot, from diesel exhaust. Efficiencies for a DPF can be 85%, and even over 90%.

Through a process known as regeneration, many DPF's burn off PM that accumulates on the filter. Regeneration may be accomplished passively by adding a catalyst to the filter. Alternatively, regeneration may be accomplished actively by increasing the exhaust temperature through a variety of approaches, e.g. engine management, a fuel burner, or resistive heating coils. Active systems use extra fuel to cause burning that heats the DPF or to provide extra power to the DPF's electrical system. Running the cycle too often while keeping the back pressure in the exhaust system low, results in extra fuel use.

A DOC may also be used as a heating-device in active regeneration of a DPF. The accumulated PM in the DPF is continuously oxidized by $NO_2$ which is generated by oxidizing NO in a DOC that is upstream of the DPF. Such a system requires accurate control to maintain the mass ratio of NO/PM in engine-out exhaust gas over a critical value. In-cylinder dosing is employed in active regeneration, where fuel injectors add a dose of fuel into the cylinder after the primary combustion has taken place. Unburned fuel is exhausted out of the cylinder downstream to the DOC where it burns and generates additional heat for the DPF. The additional heat in the DPF helps to convert the accumulated PM into ash, which has lower volume.

Engine control modules (ECM's), which are also known as engine control units (ECU's), control the engine and other functions in the vehicle. ECM's can receive a variety of inputs to determine how to control the engine and other functions in the vehicle. With regard to NOx and PM reduction, the ECM can manipulate the parameters of engine operation, such as EGR and fuel injection.

ECM's can also control the operating parameters of exhaust after-treatment devices, such as a urea-based SCR system, a DOC system, or a DPF system. For instance, an ECM can meter urea solution into the exhaust stream at a rate calculated from an algorithm which estimates the amount of NOx present in the exhaust stream as a function of engine operating conditions, e.g. vehicle speed and load. As a further example, an ECM can monitor one or more sensors that measure back pressure and/or temperature, and based on pre-programmed set points, the ECM activates the regeneration cycle.

SUMMARY

In accordance with one aspect of the disclosure, a system for optimizing consumption of fuel and reductant for an internal combustion engine system includes a combustion engine producing a flow of engine exhaust emissions, a dosing unit configured to introduce a reducing agent into the engine exhaust emissions flow, a cost ratio determining module configured to determine a reductant-to-fuel cost ratio value from among plural predetermined reductant-to-fuel cost ratio values, at least one exhaust after-treatment device including a selective catalytic reduction (SCR) catalyst adapted to convert the engine exhaust emissions to converted exhaust emissions through a reduction process utilizing the reducing agent, and a mode determining module configured to determine an operating mode of the combustion engine and the after-treatment device based on the determined cost ratio value. The exhaust emissions downstream the selective catalytic reduction (SCR) catalyst is below a target emissions level while operating in the determined operating mode.

In another aspect of the present disclosure, a method for optimizing consumption of fuel and reductant for an internal combustion engine system including a combustion engine producing a flow of engine exhaust emissions, a dosing unit configured to introduce a reducing agent into the flow of engine exhaust emissions, and a selective catalytic reduction (SCR) catalyst adapted to convert the flow of engine exhaust emissions to converted exhaust emissions through a reduction process utilizing the reducing agent, includes determining, from among plural predetermined reductant-to-fuel cost ratio values, a reductant-to-fuel cost ratio value; and determining an operating mode of the combustion engine and the after-treatment device based on the determined cost ratio value. After the step of determining the operating mode, the exhaust emissions downstream of the selective catalytic reduction (SCR) catalyst is below a target emissions level.

These and other aspects will become more apparent from the following detailed description of exemplary embodiments when viewed in conjunction with the accompanying drawings.

DETAILED DESCRIPTION

Figure 1:
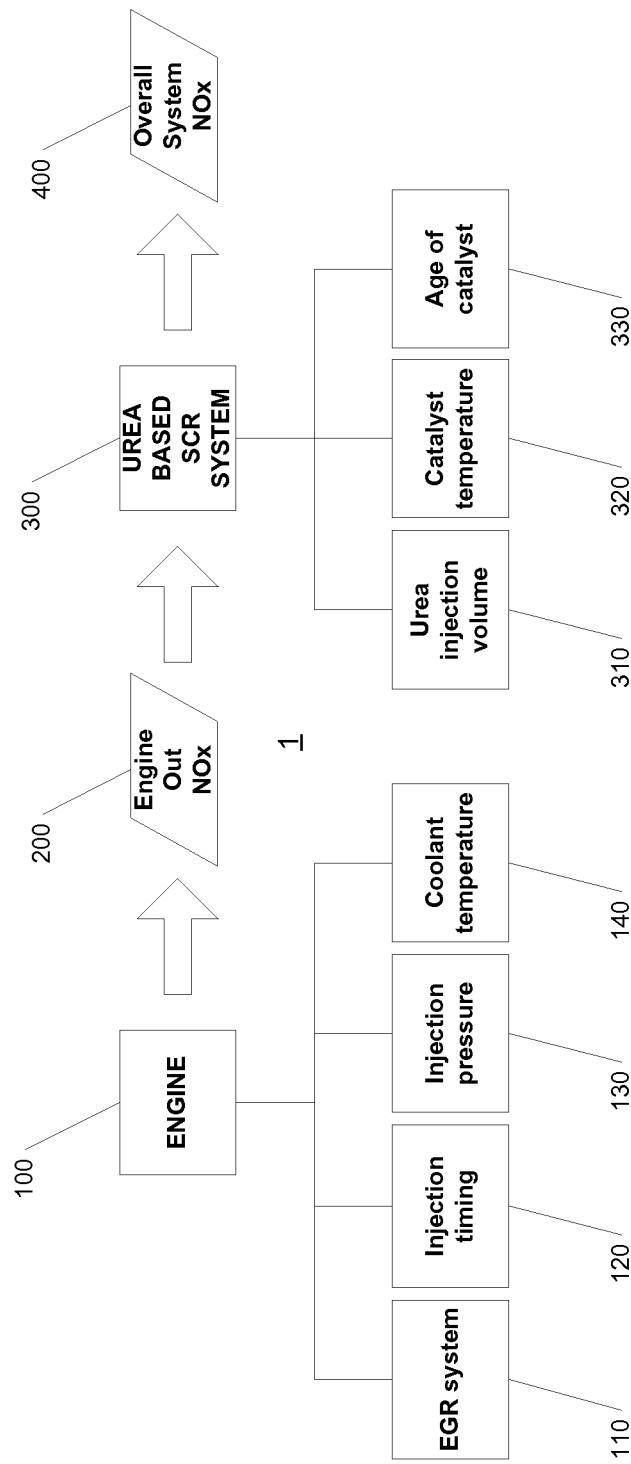
FIG. 1 is a diagram showing an engine and after-treatment system and how overall system NOx is created according to various characteristics of the engine and a urea-based SCR system.

Urea-based SCR catalysts can be very effective in reducing the amount of NOx released into the air and meeting stringent emissions requirements. To this end, diesel vehicles employing urea-based SCR generally carry a supply of aqueous solution of urea in a refillable container or tank, which allows vehicles to replenish their supplies of urea. Although the automotive urea infrastructure is slowly improving in the U.S., the inventors realized that the cost of urea is likely to be volatile in the U.S. because continued development of the urea infrastructure is likely to remain slow as future demand for urea grows. For example, in Europe, where the price of diesel fuel is generally much higher than the expected price of urea, the SCR system can use as much urea as necessary to reduce NOx and achieve maximum fuel economy during combustion in the engine, notwithstanding any problems with urea distribution. In contrast, use of urea in the U.S. will probably be more measured, because the price of urea will likely be closer to the price of diesel. Moreover, the problems with urea distribution and pricing are coupled with fluctuations in diesel fuel prices.

Additionally, the inventors appreciated that compliance with increasingly stringent government emissions mandates can include optimizing a balance between fuel (e.g., diesel fuel) and reductant (e.g., urea-based DEF) consumed. For instance, the engine out NOx can be increased and lead to better fuel economy. In such a case, the DEF consumption would likely increase to process the increased engine out NOx and meet the emissions target.

For optimization in terms of cost, it is generally estimated that reductant is about two thirds the cost of diesel fuel, but cost can vary based on a number of factors including, for example, market conditions or a regional tax structure of the fluids. For example, a baseline engine/after-treatment system fluid consumption can be optimized based on a 2/3 reductant-to-fuel cost ratio. If reductant were to become half the cost of diesel fuel, from the equipment operator's perspective, it would be economically advantageous to consume more DEF and less diesel fuel than the baseline amount while meeting or exceeding emissions targets. Similarly, if reductant were to become equal to the cost of diesel fuel, from the equipment operator's perspective, it would be economically advantageous to consume less DEF and more diesel fuel than the baseline amount while meeting or exceeding emissions targets.

The inventors further realized that engine controllers, such as ECM's (ECU's), currently do not account for the monetary cost of operating the engine and the monetary cost of operating an after-treatment system. Although operating maps (e.g., lookup tables) may be designed with consideration to a predetermined baseline ratio, there is no indication of the fuel and reductant monetary cost stored in the ECM. Nor are computations carried out in the ECM based on a reductant-to-fuel cost ratio. More specifically, price inputs for fuel and reductants, such as urea, are not currently specified for ECM algorithms. As a result, no ECM's, or the vehicles that use them, are able to dynamically adjust the use of fuel and reductants, such as urea DEF, based on a reductant-to-fuel cost ratio to achieve cost-effective operation of the vehicle while complying with emissions regulations.

The following presents a detailed description of a system and method that attempts to adjust performance of an engine system using the above-described reductant and/or fuel price volatility and/or reductant availability concerns by determining an optimal operating mode for an engine and an emissions after-treatment device according to the monetary cost ratio of reductant to fuel while maintaining emissions targets in each operating mode. It is to be noted that while exemplary embodiments are discussed herein in terms of an engine system and method of operating an engine system that utilize an ECM to reduce total NOx exhaust emissions based on a reductant-to-fuel cost ratio, the scope of the present disclosure allows for variations from these exemplary embodiments.

The system and method disclosed herein utilize plural operating modes, which can be calibrated in the ECM and/or one or more other control module. Each mode has its own unique settings for operating parameters, such as fueling and timing of injection, which impact fuel and reductant consumption. The engine and after-treatment system maintains compliance with emissions targets in all operating modes. In one embodiment, a physical or virtual switch can switch between operating modes, for example, by manipulating an operating panel or an interface (e.g., a GUI) on a display (e.g., a touchscreen display) associated with the engine and after-treatment system. In another embodiment, switching between operating modes can be performed via a wireless communication with the equipment and performed intermittently, periodically, or in real time.

Referring to FIG. 1 of the accompanying drawings, a system 1 in accordance with an embodiment of the present disclosure includes an engine system 100 and associated characteristics that include, but are not limited to, an EGR system 110, injection timing 120, injection pressure 130, and coolant temperature 140. NOx emissions at various points through the system 1 are shown along the top portion of FIG. 1. The NOx emissions in the exhaust flow from the engine is depicted by engine out NOx 200, which is received by the urea based SCR system 300. Various characteristics of the urea-based SCR system 300 that can affect the level of reduction of NOx in the engine out NOx 200 include, but are not limited to, the urea injection volume 310, the catalyst temperature 320, and the age of the catalyst 330. These SCR system attributes are merely representative of how the operation of the SCR system 300 can be influenced and are provided only as an exemplary embodiment.

The overall system NOx 400 represents the amount of total NOx exhaust emissions from the entire vehicle, which must fall at or below a target emission level, for example, a level mandated by environmental regulations. The overall system NOx 400 also represents the NOx exhaust emissions that result after the engine out NOx 200 passes through the urea-based SCR system 300.

The various characteristics of the engine 100 including the EGR system 110, the injection timing 120, the injection pressure 130, and the coolant temperature 140 are merely representative of different ways that the engine out NOx 200 can be controlled and are provided only as an illustration of how embodiment consistent with the present disclosure may be implemented. Moreover, the engine 100 generally covers all aspects of the vehicle, not just those related to fuel delivery and combustion, which occur before emissions are exhausted to the after-treatment device. The after-treatment device specifically acts to reduce the pollutants in the engine out exhaust gas.

Thus, as summarized in FIG. 1, the operation of engine 100 produces the engine out NOx 200, and the amount of engine out NOx 200 depends on various characteristics of the engine 100. The engine out NOx 200 is then introduced into the SCR system 300 which reduces the amount of NOx in the engine out NOx 200 according to the various characteristics of the SCR system 300. The final amount of NOx emissions is the overall system NOx 400.

Figure 2:
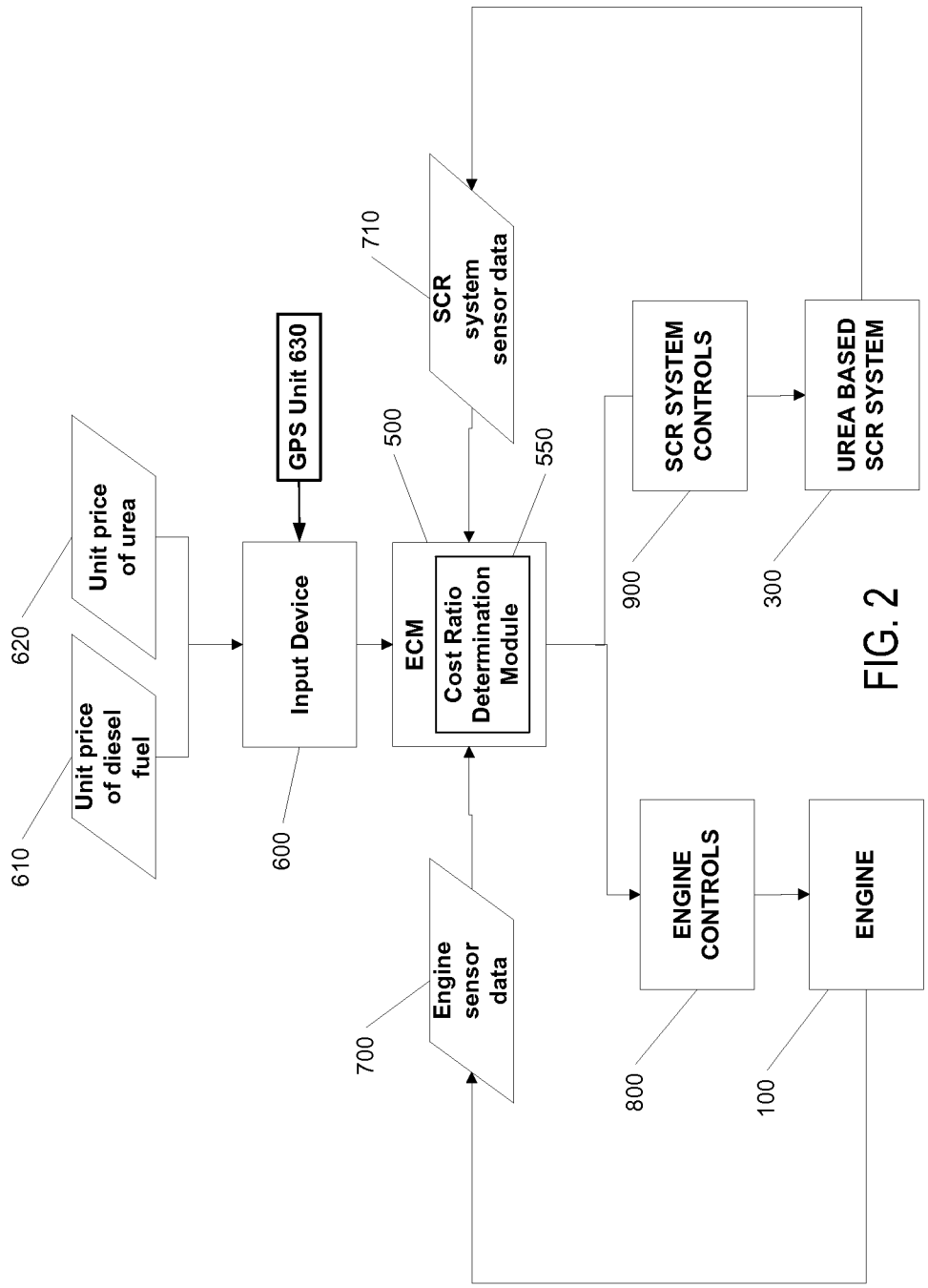
FIG. 2 is a diagram showing an ECM, how control signals are directed from the ECM, and how data are provided to the ECM, according to an exemplary embodiment.

FIG. 2 is a diagram showing control aspects of the engine and after-treatment system shown in FIG. 1. As shown in FIG. 2, an ECM 500 includes a terminal configured to receive data from input device 600 related to unit price of fuel 610 and unit price of urea 620. ECM 500 also includes one or more terminals configured to generally receive input signals transmitted from various sensors throughout the vehicle as well as possible external input data from end users. While not shown, ECM 500 can include a terminal configured to receive a requested torque and fueling based on an operator input device, such as a sensed position of an accelerator pedal or a dialed in or set cruise control device (not shown). ECM 500 includes a cost ratio determination module 550. The integrated system operates under a desired speed and fueling command generated by the engine controller in response to an operator's request. Through the use of stored engine and after-treatment tables, maps, or other modeling types, directed toward the individual operation of the engine 100 and the urea based SCR system, the ECU determines an operating mode (i.e., parameters) for optimal fuel consumption, optimal reductant (e.g., urea) consumption, and reduction of NOx emissions for each component of the integrated system, where the operating mode corresponds to the reductant-to-fuel cost ratio determined by the cost ratio determination module.

Many aspects of this disclosure are described in terms of sequences of actions to be performed by elements of a driver, controller, control module and/or a computer system or other hardware capable of executing programmed instructions. These elements can be embodied in a controller or plural controllers of an engine system, such as ECM 500 or in one or more controllers separate from, and communicating with an ECM 500. In an embodiment, the controller and/or ECM 500 can be part of an otherwise known controller area network (CAN) bus in which the controller, sensor, actuators communicate via digital CAN messages over the CAN bus. It will be recognized that in each of the embodiments, the various actions for implementing the control strategy could be performed by specialized circuits (e.g., discrete logic gates interconnected to perform a specialized function), by program instructions, such as program modules, being executed by one or more general purpose or application specific processors (e.g., a central processing unit (CPU) or microprocessor, not shown), or by a combination of both, all of which can be implemented in a hardware and/or software of ECM 500 and/or other controller or plural controllers. Logic of embodiments consistent with the disclosure can be implemented with any type of appropriate hardware and/or software, with portions residing in the form of computer readable storage medium with a control algorithm recorded thereon such as the executable logic and instructions disclosed herein, and can be programmed, for example, to include one or more singular or multi-dimensional lookup tables and/or calibration parameters. The computer readable medium can comprise any tangible medium capable of storing information, such as a random access memory (RAM), a read-only memory (ROM), an erasable programmable read-only memory (EPROM, EEPROM or Flash memory), an optical fiber, and a portable compact disc read-only memory (CD-ROM), or any other tangible media, such as solid-state, magnetic, and/or optical disk medium capable of storing information. Thus, various aspects can be embodied in many different forms, and all such forms are contemplated to be consistent with this disclosure.

ECM 500 reads program instructions and executes the instructions to perform data monitoring, logging, and control functions in accordance with the input signals and external input data. ECM 500 sends control data to an output port which relays output signals to a variety of actuators controlling the engine 100 or the SCR system 300, generally depicted by the engine controls 800 and the SCR system controls 900. In general, embodiments consistent with the present disclosure can be implemented with most commercially available ECM's, and minimal or no changes to such an ECM will be required. Although this exemplary embodiment includes an ECM 500, any system of controlling operation of engine components and after-treatment devices according to specified instructions may be employed to implement embodiments consistent with the present disclosure.

Returning to FIG. 2, according to an exemplary embodiment, the end user or some input mechanism transmits the unit price of diesel fuel 610 and the unit price of urea 620 as input parameters into the ECM 500 through the input device 600, for example, a receiving terminal of the input device. The input device 600 may include, but is not limited to, a computer, personal digital assistant (PDA), mobile communications terminal, or other entry device with a data link connected physically, wirelessly (e.g., via cellular, satellite or Bluetooth™ connection), or by any data transmission method, to the ECM 500. For example, input device 600 can include a receiver (not shown) that is configured to receive a wireless signal transmitted from a source remote from the input device 600, where the signal includes information related to the unit price of fuel 610, the unit price of urea 620 and/or the reductant (e.g., DEF)/diesel fuel cost ratio. In an embodiment, the input device can include a transmitter configured to intermittently, periodically, or by user command transmit a request to a remote system that tracks urea and diesel fuel prices or otherwise has information related to recent urea and diesel fuel unit prices. Moreover, the input device 600 may include an automated system or network which transmits data including fuel and reductant cost information to the ECM 500. Automatic updates are particularly advantageous where the unit price of diesel fuel 610 and the unit price of urea 620 may change frequently. If no input parameters are entered, the ECM can use reductant/diesel fuel cost ratio based on most recently received fuel and urea unit price data, on a history of previously input unit prices, on a predetermined default cost ratio, or on another cost ratio that reflects the most likely prices for diesel fuel and reductant.

In an embodiment, input device 600 can include a GPS unit 630 including a receiver configured to receive information related to the position and transmitted via satellite, from which the longitude, latitude and altitude of a vehicle including the engine 100, urea based SCR system 300, ECM 500, and input device 600 can be determined. ECM 500 can include, or have access to a terrain module (not shown) or transmit location information determined by GPS unit 630 to a remote computer via a wireless network and receive related terrain information from the remote computer. Vehicle location information can be used to determine DEF unit cost where regional position of the vehicle is a significant factor. The GPS unit 630 may alternatively be integrated with the ECM or communicate with the ECM 500 without communicating with the input device 600.

As shown in FIG. 2, within an operating mode, engine sensor data 700 from the engine 100 and SCR system sensor data 710 from the SCR system 300 provide additional input for the ECM 500 to determine optimal operating parameters and to allow the system to change the parameters dynamically according to changing conditions. The engine sensor data 700 provides the ECM 500 with data, such as engine speed and load, required to calculate current fuel consumption, so that the ECM 500 can compute the current cost of fuel consumption using the unit price of diesel fuel 610. In addition, the SCR sensor data 710 provides the ECM 500 with data required to calculate current urea consumption, such as the amount of engine out NOx 200, so that the ECM 500 can compute the current cost of urea consumption using the unit price of urea 620. Moreover, the ECM 500 receives data from a sensor in the SCR system outflow that indicates overall system NOx to ensure that the operating parameters are adjusted in compliance with environmental regulations. Based on the cost ratio of the fuel and reductant, the ECM 500 then sends output signals to the engine controls 800 and the SCR system controls 900 directing how the engine 100 and the SCR system 300 should operate to optimize NOx reduction.

After receiving the unit price of diesel fuel 610 and the unit price of urea 620, the ECM 500 determines an operating mode for operating engine 100 and urea based SCR system 300 based on the reductant/diesel fuel cost ratio value. This can be achieved by determining a set of operating maps from plural precalibrated operating maps, or lookup tables stored in the ECM 500, or accessible by the ECU 500, which contain engine control data such as fueling across range of engine speeds and after-treatment controls such as dosing rates across a range of engine speeds. The ECU includes a mode determining module that includes logic linking different ranges of reductant/diesel fuel cost ratio to respective sets of operating maps.

Figure 3:
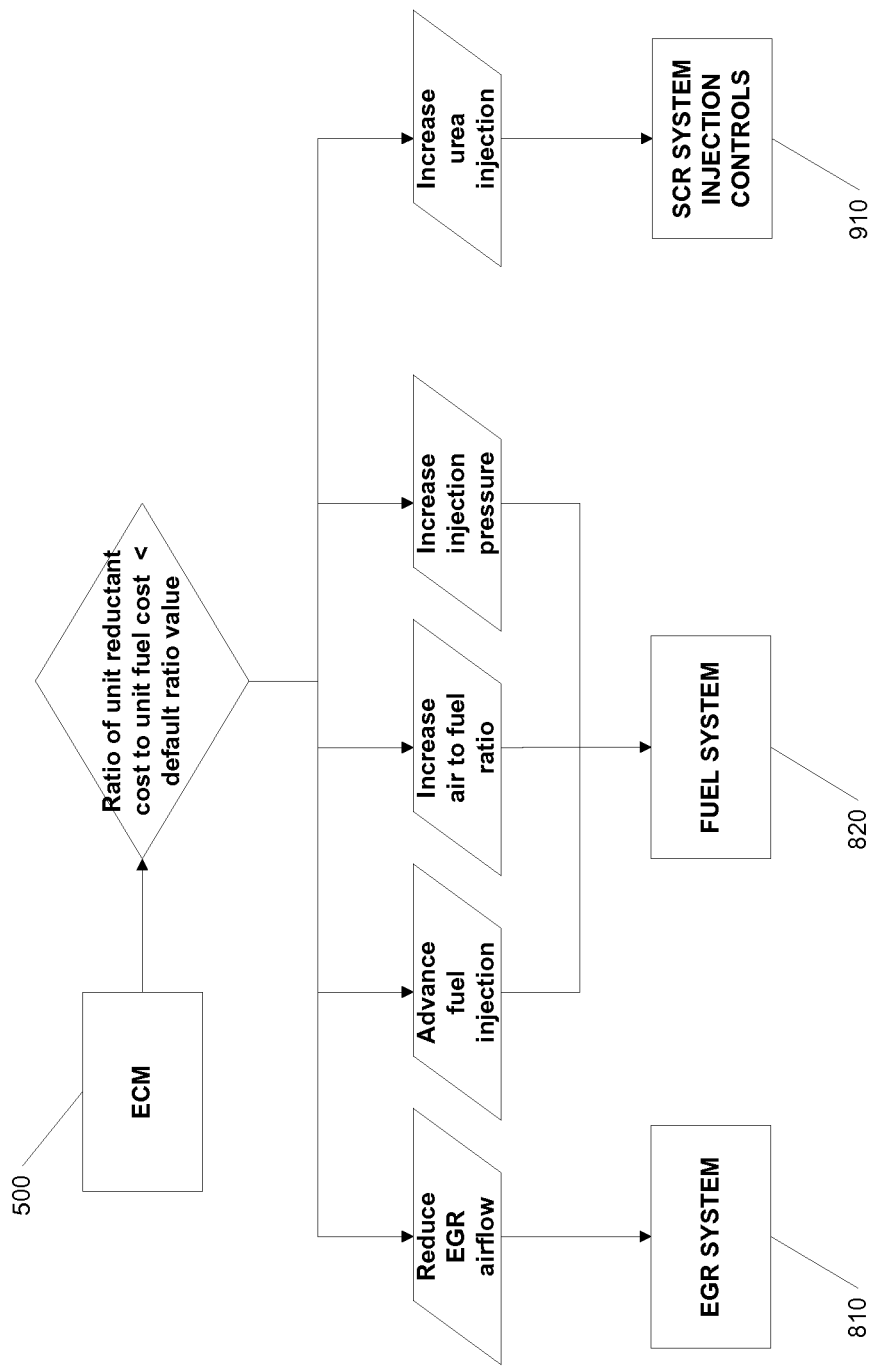
FIG. 3 is a diagram illustrating exemplary output signals from the ECM to maximize fuel efficiency when the cost of operating the engine is higher than the cost of operating the SCR system.
Figure 4:
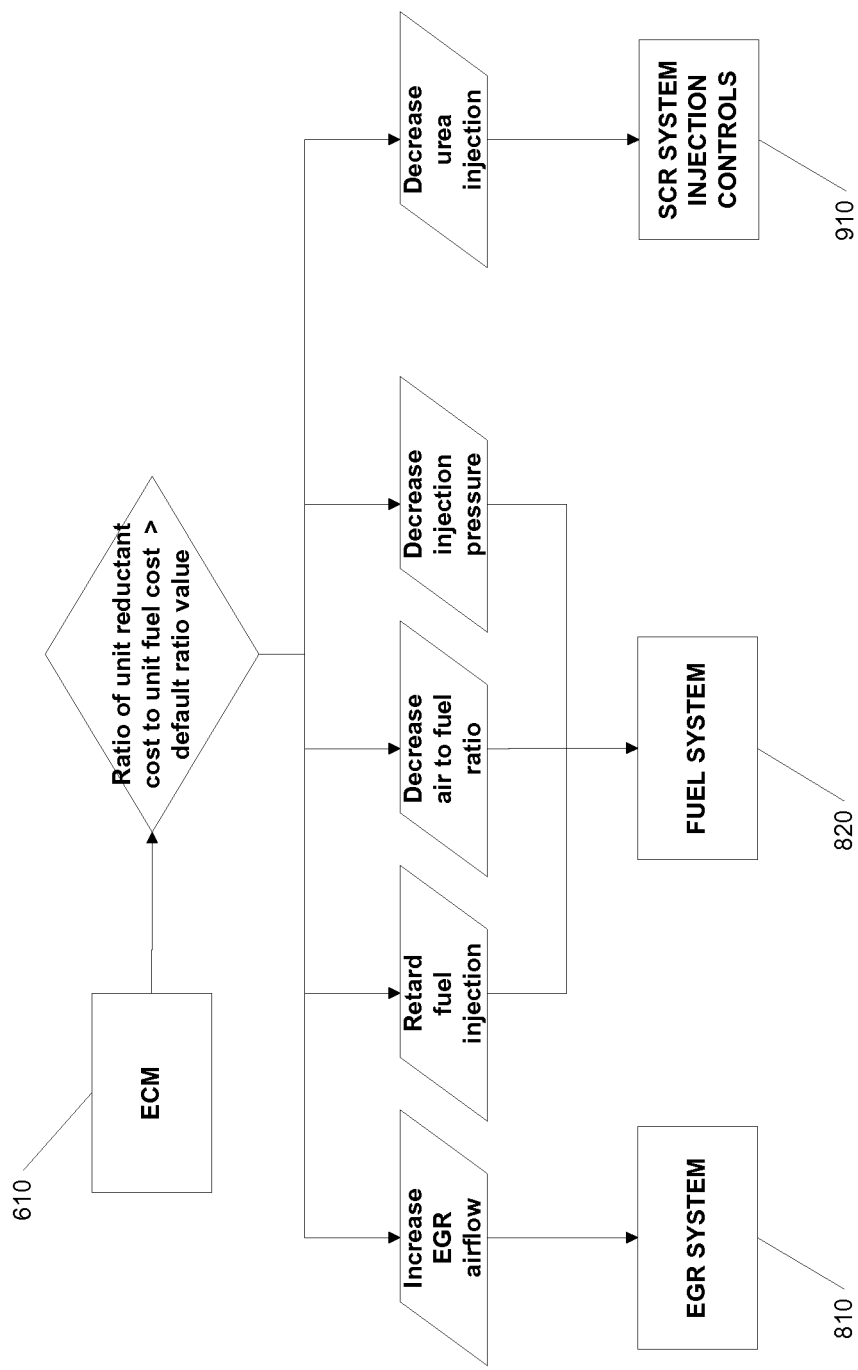
FIG. 4 is a diagram illustrating exemplary output signals from the ECM to minimize urea usage when the cost of operating the engine is lower than the cost of operating the SCR system.

FIGS. 3 and 4 are diagrams showing how engine and after-treatment controls generally adjust as the reductant-to-fuel cost ratio changes, for example, from controls corresponding to the default (baseline) operating mode.

FIG. 3 shows a situation in which the current cost of fuel consumption is higher than the current cost of urea consumption, and the ratio of unit reductant cost to unit fuel cost is less than the default, or baseline value. Relative to the baseline parameters, the ECM 500 attempts to maximize fuel efficiency by maintaining a high temperature at combustion. For example, if DEF became only half the cost of diesel fuel, from the equipment operator's perspective it would be economically advantageous to consume more DEF and less diesel fuel than the baseline amounts while maintaining emissions compliance. The ECM 500 can maximize fuel efficiency by reducing the flow of cooled exhaust air back into the combustion chamber. The ECM 500 monitors signals from sensors indicating the RPM of an energy conversion device (e.g., a turbocharger) in EGR system 810 and sensors indicating engine speed and directs the EGR system 810 to adjust the airflow to increase fuel efficiency.

In addition, the ECM 500 can send signals to calibrate the fuel system 820 to maximize fuel efficiency. The ECM 500 can control the rate of fuel delivery and the timing of injection through actuators. The ECM 500 can also control the pressure at which the fuel is injected. Advancing the fuel injection, increasing the pressure of injection, and making the air-fuel mixture leaner can be controlled alone or in combination to cause an increase in fuel efficiency. An engine speed signal can be utilized as a sensor input for the ECM 500 to properly regulate the fuel system 820.

Meanwhile, since the higher temperatures during combustion increase the engine out NOx 200, the ECM 500 can direct the SCR system injection controls 910 to increase the amount of urea injected into the SCR system 300 to reduce overall system NOx 400 and ensure compliance with environmental regulations.

FIG. 4 shows a situation in which the current cost of urea consumption is substantially the same or higher than the current cost of fuel consumption, i.e., the ratio of unit reductant cost to unit fuel cost is greater than the default, or baseline value. Relative to the baseline parameters, the ECM 500 attempts to attempts to minimize the need for urea by lowering the temperature at combustion and reducing the engine out NOx 200. For example, as shown in FIG. 4, the ECM 500 can minimize the engine out NOx 200 by increasing the flow of cooled exhaust air back into the combustion chamber. The ECM 500 monitors signals from sensors indicating the RPM of the turbocharger in EGR system 810 and sensors indicating engine speed and directs the EGR system 810 to adjust the airflow to decrease the formation of NOx in the combustion chamber.

The ECM 500 calibrates the fuel system 820 to minimize the need for urea. The ECM 500 can control the rate of fuel delivery and the timing of injection through actuators. The ECM 500 can also control the pressure at which the fuel is injected. Retarding the fuel injection, decreasing the pressure of injection, and making the air-fuel mixture less lean all help to increase fuel efficiency. An engine speed signal can be utilized as a sensor input for the ECM 500 to properly regulate the fuel system 820.

Since the lower temperatures during combustion minimize the engine out NOx 200, the ECM 500 can direct the SCR system injection controls 910 to reduce the amount of urea injected into the SCR system 300 since less urea is needed to comply with environmental regulations. It is also understood, however, that urea usage likely cannot be completely avoided, since there may be limits to the amount that the engine out NOx 200 can be reduced.

A sensor may also be required at a position in the exhaust flow downstream the SCR catalyst to monitor ammonia slip to make sure that too much urea is not being introduced and to ensure compliance with regulations governing ammonia slip.

FIGS. 3 and 4 are only exemplary in nature and represent general trends of operating modes on either side of the baseline value for the reductant-to-fuel cost ratio. Additionally, selection by the ECU 500 of a specific operating mode can include matching a current reductant-to-fuel cost ratio to one of plural predetermined ranges of reductant-to-fuel cost ratio values, and then determining an operating mode corresponding to a specific set of engine fueling and reductant dosing tables that correspond to the range according to a predetermined relationship. For instance, the predetermined relationship between reductant-to-fuel cost ratio ranges and sets of engine fueling and reductant dosing tables can be stored in a data table in the ECU or accessible by the ECU.

Alternatively, the ECU can simply round the calculated reductant-to-fuel cost ratio value to a closest predetermined value, for example 0.3, 0.5, 0.7, 0.9, 1.1 etc. stored in a linked list of reductant-to-fuel cost ratio values, where each predetermined ratio value is linked to a predetermined operating mode. Further, controlling the EGR system and the fuel system in the manner described above are only examples of how to affect the combustion temperature and thereby control the amount of NOx. There are also other ways of controlling the amount of urea needed in the SCR system. The examples provided are not intended to limit the methods by which combustion temperature or urea usage are controlled. Moreover, the ECM 500 does not have to adjust all the available operating parameters that affect fuel efficiency and NOx emissions. For instance, the ECM 500 may be able to increase fuel efficiency without having to increase urea usage if the SCR sensor data 710 indicates that the overall system NOx 400 will remain at or below mandated limits after the adjustment. Thus, the ECM 500 might only send signals to adjust engine controls 800. Similarly, if the overall system NOx 400 will remain at or below mandated limits, the ECM can send signals to the SCR system injection controls 910 to reduce the amount of urea injected into the SCR system 300 without having to reduce fuel efficiency. Further, a selection of a specific operating mode for a current reductant-to-fuel cost ratio value can also depend on the geographic position of the vehicle, from example as determined from GPS data received by GPS unit 630, and/or terrain data corresponding to the vehicle's position.

In another exemplary embodiment, a manual adjustment can in system 1 be made to select a reductant-to-fuel cost ratio value from among plural predetermined values, which causes an ECU or other controller to operate in a mode. For example, a reductant-to-fuel cost ratio value can be selected or fixed by way of a service tool adjustment, a switch on a control panel, or a selection from a touch display. This embodiment can be useful in situations where reductant availability is limited to a fixed small volume, to achieve a desired reductant refill rate, or achieve a desired level of performance (e.g., better transient response). For example, A forklift manufacturer may want to provide a selection between a first state of low reductant consumption and high diesel consumption corresponding to a high reductant-to-fuel cost ratio value, and a second state of relatively higher reductant consumption and lower fuel consumption corresponding to a low reductant-to-fuel cost ratio value. The forklift operator may want to select the first state, for example by way of a service tool or switch, regardless of the price impact in order to minimize the size of the reductant tank for packaging purposes.

The description provided in reference to FIGS. 1-4 explains how an ECM is implemented to reduce total NOx exhaust emissions from a diesel engine by determining appropriate operating mode (parameters) for engine components and a urea-based SCR system according to the price of diesel fuel and the price of urea. It is understood, however, that a diesel engine may be integrated with other after-treatment devices in addition to a urea-based SCR system. In particular, after-treatment devices that are directed toward reducing PM emissions may be employed. An example is illustrated by the integrated system 1000 in FIG. 5.

Figure 5:
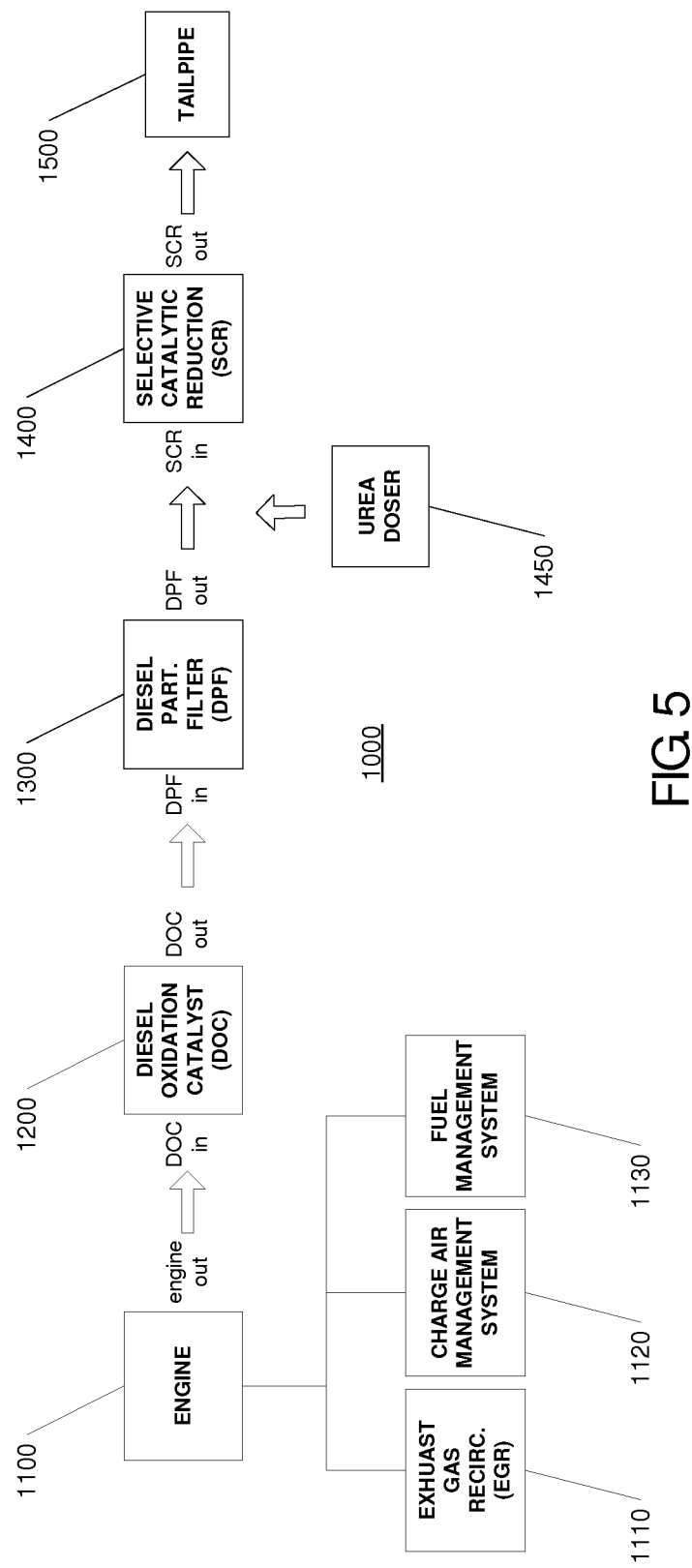
FIG. 5 is a diagram illustrating an exemplary system that integrates an engine with a DOC system, a DPF system, and an SCR system.

Thus, further embodiments of the present disclosure provide a method for optimizing the performance of a system in view of reductant and fuel cost that integrates an engine and several after-treatment devices, as shown in FIG. 5. Specifically, the performance of the integrated system is optimized while ensuring compliance with required emissions levels. The integrated system operates under a desired speed and fueling command generated by the engine controller in response to an operator's request. As such, a method according to the present disclosure may be applied under i) steady state or relatively slow transient conditions, or ii) under moderate to rapid transient conditions. Moderate to rapid transient conditions may occur when the engine duty cycle is changing, when the after-treatment system is warming up, or when the after-treatment is responding thermally to a change in engine duty.

In the exemplary embodiment of FIG. 5, an EGR system 1110 is used in conjunction with the base engine charge air management system 1120 and fuel management system 1130 to regulate NOx and PM emissions from the engine 1100. Additionally, the subsystems of the overall A/T system in the integrated system 1000 include a DOC system 1200, a DPF system 1300, and a urea-based SCR system 1400 including a urea doser 1450. A cost ratio determination module, as shown in FIG. 2, is configured to determine a reductant-to-fuel cost ratio value from among plural stored reductant-to-fuel cost ratio values, and from this value determine the performance mode of the subsystems 1200, 1300, 1400 as well as the engine 1100, in view of emissions requirements and optimizing the consumption of fuel and reductant based on their respective unit costs. The cost ratio determination module can be employed as a part of an ECM (not shown in FIG. 5), as described previously. The integrated system operates under a desired speed and fueling command generated by the engine controller in response to an operator's request. Through the use of stored engine and after-treatment tables, maps, or other modeling types, directed toward the individual operation of the engine 1100 and each after-treatment subsystem 1200, 1300, 1400, the ECU determines an operating mode (i.e., parameters) for optimal fuel consumption, optimal reductant (e.g., urea) consumption, and reduction of NOx and PM emissions for each component of the integrated system that corresponds to the reductant-to-fuel cost ratio determined by the cost ratio determination module.

It is to be understood that embodiments consistent with the present disclosure are susceptible of broad utility and application. Many embodiments and adaptations of the present disclosure other than those herein described, as well as many variations, modifications and equivalent arrangements, will be apparent from, or reasonably suggested without departing from the substance or scope of the present disclosure. For example, while an exemplary embodiment described above includes an SCR catalyst and EGR, it is to be understood that embodiments of other systems and methods consistent with the disclosure can include any of a number of subsystem combinations, for example, a combination including internal combustion engine and SCR subsystems; a combination including internal combustion engine, DOC, and SCR subsystems; a combination including internal combustion engine, DOC, DPF, and SCR subsystems.

What is claimed is:

1. A system for optimizing consumption of fuel and reductant for an internal combustion engine system, the system comprising:
    a combustion engine producing a flow of engine exhaust emissions;
    a doser configured to introduce a reducing agent into the engine exhaust emissions flow;
    a cost ratio determining module configured to determine a reductant-to-fuel cost ratio value from among plural predetermined reductant-to-fuel cost ratio values;
    at least one exhaust after-treatment device including a selective catalytic reduction (SCR) catalyst adapted to convert the engine exhaust emissions to converted exhaust emissions through a reduction process utilizing the reducing agent; and
    a mode determining module configured to determine an operating mode of the combustion engine and the after-treatment device based on both the determined reductant-to-fuel cost ratio value and a geographic position of a vehicle,
    wherein the exhaust emissions downstream the selective catalytic reduction (SCR) catalyst is below a target emissions level while operating in the determined operating mode.

2. The system according to claim 1, further comprising:
    an input device configured to receive information relating to a unit cost of reductant and a unit cost of fuel, wherein the cost ratio determining module determines the reductant-to-fuel cost ratio value from among plural predetermined reductant-to-fuel cost ratio values based on the received information.

3. The system according to claim 2, wherein the information relating to unit cost of reductant and unit cost of fuel is transmitted from a site remote from the input device to the input device.

4. The system according to claim 2, wherein the input device is configured to receive entry of the information relating to the unit cost of reductant and the unit cost of fuel is entered.

5. The system according to claim 1, wherein the reducing agent is one of anhydrous NH3, aqueous NH3, and urea.

6. The system according to claim 1, wherein the doser is a diesel exhaust fluid (DEF) dosing system.

7. The system according to claim 1, wherein the dosing unit is configured to inject ammonia via a solid ammonia cartridge.

8. A method for optimizing consumption of fuel and reductant for an internal combustion engine system including a combustion engine producing a flow of engine exhaust emissions, a doser configured to introduce a reducing agent into the flow of engine exhaust emissions, and a selective catalytic reduction (SCR) catalyst adapted to convert the flow of engine exhaust emissions to converted exhaust emissions through a reduction process utilizing the reducing agent, the method comprising:
    determining, from among plural predetermined reductant-to-fuel cost ratio values, a reductant-to-fuel cost ratio value; and
    determining, using a, mode determining module, an operating mode of the combustion engine and the after-treatment device based on both the determined reductant-to-fuel cost ratio value and a geographic location of a vehicle, wherein
    after the step of determining the operating mode, the exhaust emissions downstream of the selective catalytic reduction (SCR) catalyst is below a target emissions level.

9. The method according to claim 8, further comprising:
    receiving information relating to a unit cost of reductant and a unit cost of fuel, wherein determining the reductant-to-fuel cost ratio value from among plural predetermined reductant-to-fuel cost ratio values is based on the received information.

10. The method according to claim 9, wherein the information relating to the unit cost of reductant and the unit cost of fuel is transmitted from a remote site.

11. The method according to claim 9, further comprising:
    entering the information relating to the unit cost of reductant and the unit cost of fuel through an input device.

12. The method according to claim 8, wherein the reducing agent is one of anhydrous NH3, aqueous NH3, and urea.

13. The method according to claim 8, wherein the doser is a diesel exhaust fluid (DEF) dosing system.

14. The method according to claim 8, wherein the doser is configured to inject ammonia via a solid ammonia cartridge.

* * * * *